UNITED STATES PATENT OFFICE.

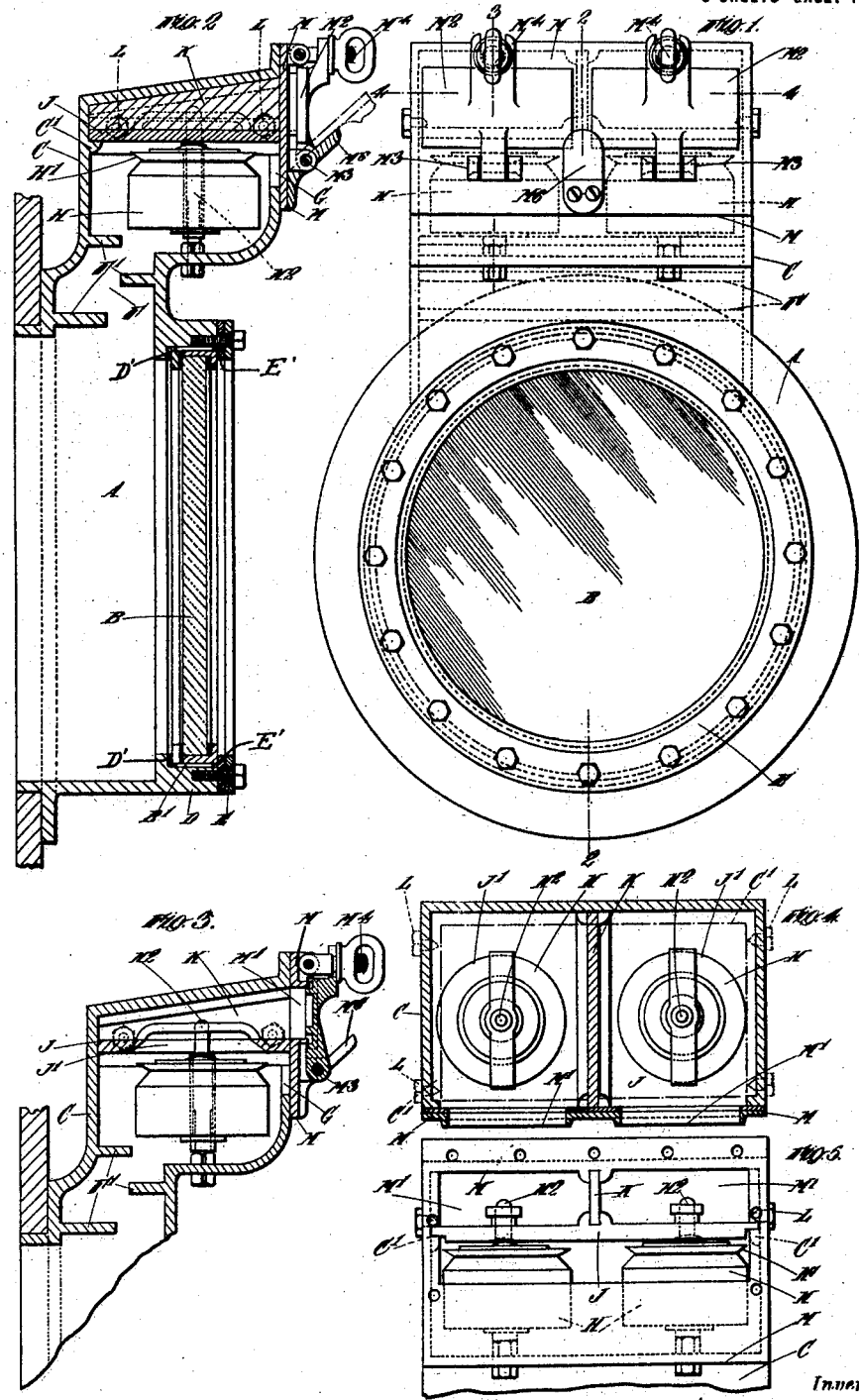
T. UTLEY.
SHIP'S LIGHT.
APPLICATION FILED SEPT. 11, 1918.
1,393,857. Patented Oct. 18, 1921.
3 SHEETS—SHEET 1.

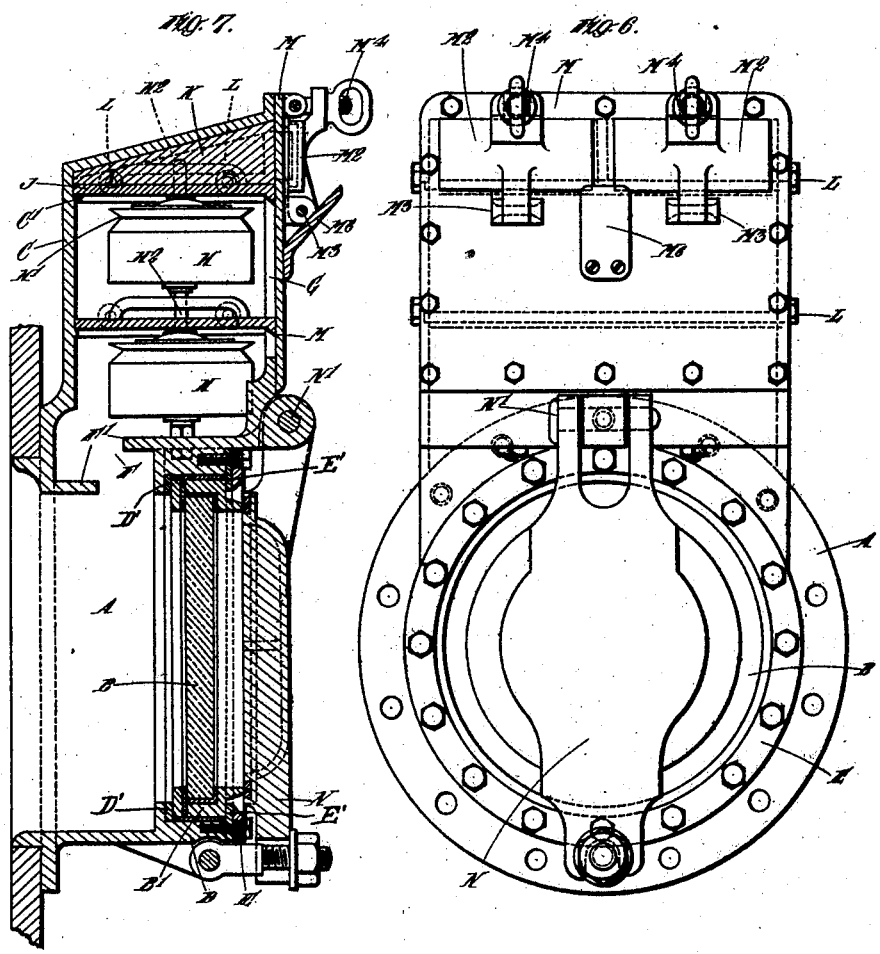

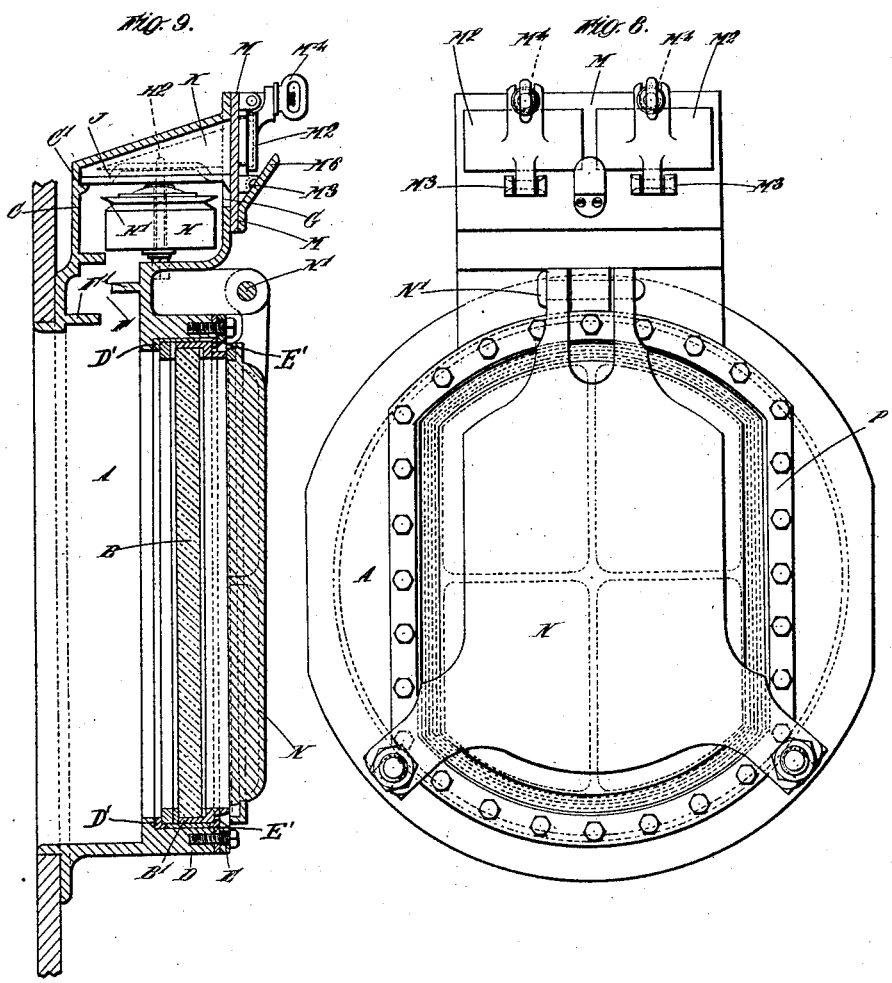

THOMAS UTLEY, OF LIVERPOOL, ENGLAND.

SHIP'S LIGHT.

1,393,857.  Specification of Letters Patent.  Patented Oct. 18, 1921.

Application filed September 11, 1918. Serial No. 253,566.

*To all whom it may concern:*

Be it known that I, THOMAS UTLEY, a subject of the King of Great Britain, residing at Sefton House, Crosby Green, West Derby, Liverpool, in the county of Lancaster, England, have invented certain new and useful Improvements in or Relating to Ships' Lights, of which the following is a specification.

This invention relates to combined fixed lights and ventilators for ships. The "Convention of Safety of Life at Sea" has imposed certain restrictions with regard to the employment of ordinary opening or ventilating lights as the same are not regarded by the said convention as safe for use in some parts of the ship, as for instance in a seven-foot freeboard. It is therefore the chief object of my present invention to provide an improved construction of combined fixed light and ventilator in order to meet the requirements of the said convention as regards safety and also as regards the requirements in connection with the periodical inspections of the ventilating means.

According to one feature of the invention the main frame of my improved combined fixed light and ventilator comprises a suitable part in which an independent frame or holder containing the glass plate is secured by suitable means such as a separate retaining ring which is bolted to the main frame against the glass holder or a retaining ring or flange on the glass holder bolted to the main frame, thus providing a fixed or non-opening light as set forth in the specification of my prior application for United States patent Serial No. 30475. This construction of fixed light has proved to be extremely safe under severe tests and most unfavorable conditions and is therefore especially suitable for the purposes of the present invention in order that maximum strength and great safety may be insured. The said main frame is formed to provide a ventilator which is preferably provided with buoyant valves adapted to be automatically closed in the event of inrush of water into the ventilator opening. Suitable baffles may be used in conjunction with the valves for hindering or impeding the inrush of water. The arrangement and mounting of the valves and the parts appertaining thereto constitute an important feature of my invention inasmuch that the valves and other parts may be removed very quickly and easily for inspection and replaced equally as quickly and easily the arrangement being such that water proof joints of the various parts are obtained thereby enabling the required degree or standard of safety to be obtained in order to produce an efficient combined light and ventilator.

This construction allowing for quick removal and replacement of the valves and other parts is of considerable practical importance and results in very great saving of time in inspecting say under the require ments of the "Convention of Safety of Life at Sea" so that there is no likelihood of the ship being held up or delayed while in dock by such inspection.

In order that the invention may be clearly understood and readily carried into effect the same will now be described more fully with reference to the accompanying drawings, in which:—

Figure 1 is a face view of one construction of the combined fixed light and ventilator as seen from the interior of the ship.

Fig. 2 is a vertical sectional view taken on the line 2—2 of Fig. 1.

Fig. 3 is a fragmentary vertical sectional view taken on the line 3—3 of Fig. 1.

Fig. 4 is a sectional plan taken on the line 4—4 of Fig. 1.

Fig. 5 is a fragmentary face view with the front cover plate removed.

Figs. 6 and 7 represent respectively a face view and a vertical sectional view of another construction of the combined fixed light and ventilator with a cover or deadlight fitted thereto.

Figs. 8 and 9 are similar views to Figs. 6 and 7 illustrating the invention applied to a ships' light having a circular glass plate in a frame which presents an approximately rectangular appearance inboard.

Similar letters of reference indicate corresponding parts in the various modifications illustrated by the aforesaid figures.

A is the main body or casing of the combined fixed light and ventilator the lower part of which is shaped to receive the glass plate B while the upper part is shaped to provide the ventilator portion C of the structure. The lower part of the casing A is secured around the port hole in the ship in any usual manner and it projects inboard to form a cylindrical part which is shaped at its inner or inboard end to form a frame D which receives or houses the glass B. The glass B is retained in a holder B′ adapted to be fitted within the frame D of the casing and to be permanently secured in position by a retaining ring E bolted to the frame D. Interposed between frame D and holder B′ is a soft resilient substance or packing D′, preferably rubber, and likewise between the holder B′ and retaining ring E is another soft resilient packing E′, forming a cushioned support around both side edges of the holder B′ supporting the glass. This construction of fixed light forms the subject of my prior application for United States patent Serial No. 30475 and as a result of severe tests it has proved to be of considerable strength so that it is admirably suited for the purpose of the present invention. Although the glass holder B′ containing the glass B may be retained in position by a separate retaining ring, the retaining member or ring may form part of the glass holder as set forth in the alternative construction disclosed in my said prior patent specification.

The ventilator portion of the casing is constituted by a box like extension C on the upper part of the casing A the lower part of the box like extension being formed with an opening F which provides a passage way for air flowing into the open part of the casing A to enter the interior of the box like extension or ventilator casing C. The inboard part of the ventilator casing C is formed with an opening G and the interior of this casing is adapted to contain valves H H which are preferably made hollow so as to be buoyant and are provided with rubber flanges or closing rings H′ H′. Each valve is vertically movable on an axially or centrally arranged pin $H^2$ secured in the lower part of the box like extension. Above the valves a seating plate J having openings or holes J′ coaxially arranged with respect to the valves, is supported on an internal ledge C′ of the ventilator casing and it is retained in position by means of a wedge bar K inserted between the middle part of the plate J and the top of the ventilator casing, while wedge shaped or tapered pins or bolts L at the sides of the ventilator casing C bear on the upper edges of the seating plate J which latter is therefore held very securely in position so as to produce a water tight joint. A cover plate M having two openings M′ M′ (see Figs. 3 and 4) is bolted to front of the ventilator casing the said cover plate M carrying two doors $M^2$ $M^2$ hinged or pivoted at $M^3$ and each provided with a rubber insertion adapted to bear against a rim surrounding each opening M′ in the plate M when the doors are retained in the closed position by the swing bolts and nuts $M^4$ as shown. The plate M is also provided with a stop $M^6$ arranged to form a support for either or both of the hinged doors or covers when in the open position. Normally as shown in Fig. 1, the valves H are maintained by the action of gravity in a position in which the rubber flanges H′ are not in contact with the seating plate J and when the doors $M^2$ are open a passage way is provided through the opening F, the holes J′ and the opening M′ to admit ample flow of air from the exterior to the interior of the ship, so that adequate ventilation may be effected under suitable conditions. In order to enhance the safety of the improved device staggered baffle plates F′ are formed or provided in the passage F to hinder or impede entry of water when in rough seas. Should however any water pass the baffle plates F and reach the valves H, the latter by reason of their buoyancy will be raised by the water so that the rubber flanges H′ H′ seat around the openings J′ in the seating plate J and thus prevent entry of the water to the interior of the ship. Thus the admission of air to the ship is insured by means which give maximum safety against entry of water under all conditions owing to the double and positive checking devices afforded by the baffles F′ and the valves H. If desired the doors $M^2$ may be closed to prevent admission of the air and also to prevent admission of water in the unlikely event of the valves H H being rendered inoperative. If one valve should become inoperative, the corresponding door could be closed although the other door could be kept open to admit air as the wedge bar K would prevent any water which might pass the supposed inoperative valve from passing through the open door to the interior of the ship, while the operative valve would be raised by the water to close its respective opening J′ and thus prevent entry of water to the interior of the ship.

In Figs. 6 and 7 a somewhat similar arrangement is shown, the ventilator however containing four valves H H arranged in coaxial pairs. A cover or dead light N is also shown in this modification and is pivoted at a point N′ to the ventilator casing C.

Figs. 8 and 9 show the invention applied to a special type of light which I have devised. This light comprises a frame, part of which is circular to fit in the usual circular port hole in the ship while the inboard part of the frame is formed with a semi-rectangular opening P. In this case the hinged cover or dead light N is shaped to correspond with the semi-rectangular opening P around the glass.

The constructions of the ventilator above described permit of ready and easy removal of the parts for inspection and replacement of the same; for this purpose the cover plate M is removed by unscrewing the bolts (see Fig. 6), and the wedge piece K is then withdrawn from the position shown. After unscrewing the wedge screws L L the seating plate J can be raised to the top of the ventilator casing or containers clear of the spindle on the valve into a position in which it can be removed by withdrawing through the opening in the casing. The valve is then raised clear of the guiding spindle on which it slides. In the case of superposed valves (See Fig. 7) the lower seating plate is then removed by raising or withdrawing it and the lower valves can be removed as aforesaid.

What I claim and desire to secure by Letters Patent of the United States is:—

1. A combined fixed light and ventilator, comprising a frame shaped to constitute the ventilating casing, a valve detachably mounted on a vertical spindle in said casing, a valve seating plate supporting above the valve on ledges in said casing and retained by wedge screws bearing on the sides of the plate and by a detachable wedge piece between the upper part of the said casing and the seating plate and a detachable cover having a ventilating opening therein and secured over an opening in the said casing through which latter opening the valve and seating plate can be removed or replaced.

2. A combined fixed light and ventilator, comprising a frame shaped to constitute the ventilator casing, superposed valves detachably mounted on vertical spindles in said casing, seating plates for the valves supported on ledges in the casing, and retained by wedge screws bearing on the sides thereof, the upper seating plate also being retained in position by a detachable wedge piece between the upper part of the said casing and the seating plate, and a detachable cover having ventilating openings and secured over an opening in the said casing through which latter opening the valves and seating plates may be removed or replaced.

THOMAS UTLEY.